CONTROL APPARATUS

Filed Feb. 15, 1965 4 Sheets-Sheet 1

INVENTOR.
CHRISTOPHER E. BURROWS
LLOYD S. MILLS
BY
Bruce C Lutz
ATTORNEY

INVENTOR.
CHRISTOPHER E. BURROWS
LLOYD S. MILLS
BY Bruce C. Lutz
ATTORNEY

Oct. 1, 1968 C. E. BURROWS ET AL 3,404,374

CONTROL APPARATUS

Filed Feb. 15, 1965 4 Sheets-Sheet 3

INVENTOR.
CHRISTOPHER E. BURROWS
LLOYD S. MILLS

BY Bruce C Lutz

ATTORNEY

INVENTOR.
CHRISTOPHER E. BURROWS
LLOYD S. MILLS
BY
Bruce C. Lutz
ATTORNEY

United States Patent Office 3,404,374
Patented Oct. 1, 1968

3,404,374
CONTROL APPARATUS

Christopher E. Burrows, Woburn Sands, England, and Lloyd S. Mills, New Brighton, Minn., assignors to Honeywell Inc., Minneapolis, Minn., a corporation of Delaware Filed Feb. 15, 1965, Ser. No. 432,566
Claims priority, application Great Britain, Feb. 22, 1964, 7,498/64
9 Claims. (Cl. 340—147)

ABSTRACT OF THE DISCLOSURE

A system of relay trees is shown wherein the trees overlay so that connections can be made between a given branch connection and the main or trunk connection of more than one tree. The overlapping of the trees is effected by connecting groups of branch connections to two or more trees. The disclosure also shows a matrix for coupling selected signals to the main connections of the relay trees and a tape-controlled system for controlling the relays to establish signal paths through the matrix and relay trees.

The present invention relates to electric switching systems and in particular to switching systems which can be controlled selectively to connect one or some of a first set of connections to selected ones of a second set of connections.

It is known to use so-called switching trees for this purpose. A switching tree basically includes a number of interconnected switching elements, often relay contacts, which can be set up selectively, for example by energizing selected relays, to connect a main connection to any selected one, but only one at any given time, of a number of branch connections.

In simple binary switching trees employing switch contacts as the switching elements, one change-over contact is connected to the main connection so that it can connect it to either of two lines, two further change-over contacts are arranged so that each of the two lines can be connected to either of two or more lines, i.e. four lines in all. Four further change-over contacts are arranged so that each of the four lines can be connected to either of two more lines forming eight in all, and so on until there are enough lines available that each of the branch connections can be connected to a different line. It will be appreciated that if the number of branch connections is not a power of two some lines will have to be left spare. Each set of contacts is referred to as "a level" and the states of the contacts in the different levels determine which of the $2^n$ lines provided by the $n$th level (where $n$ is the total number of levels, is connected at any given instant to the main connection. A binary switching tree with $n$ levels is referred to as an $n$-level binary switching tree.

Where it is required to connect selected ones of a relatively large first set of connections to selected ones of a smaller second set of connections an appropriate number of binary switching trees may be employed. For example, if there are two hundred and fifty-six connections in the first set and four in the second, four five-level binary switching trees may be employed each contributing sixty-four of the first set of connections and one of the second set. It will be appreciated that the number of trees and the number of levels in them can always be chosen to fit any particular case.

A disadvantage of this last arrangement is that of the sixty-four branch connections to a single tree, only one can be selected at a time. Therefore, if the arrangement is required for use in carrying out a complex switching sequence involving the connection of different ones of the first set of connections to the various connections of the second set at different times, some inflexibility in arranging the sequence may be encountered which may, for example, involve unnecessarily increasing the time taken to perform a given sequence, since two connections of the first set which are connected to the same tree cannot be employed simultaneously while at the time when this requirement arises one or more of the other trees may not be in use at all.

According to the present invention, an electric switching system comprises a number $m$ of $n$-level switching trees, each capable of being set up selectively to connect a main connection to any one of $2^n$ branch connections, each tree having a first group of its branch connections connected in common one with each of an equal number of the branch connections of another tree and a second group of its other branch connections connected in common one with each of an equal number of the branch connections of yet another tree, the arrangement being such that each of the first and second groups of branch connections of each tree can be connected, if the trees are suitably set up, to the main connection of any of the trees to which it is common.

Further, according to a feature of the present invention, an electric switching system as defined in the preceding paragraph may be employed in combination with a switching matrix having a first set of $m$ lines, a second set of $l$ lines and switching means enabling an electrical connection to be established selectively between each of the $m$ lines and any of the $l$ lines (i.e. a connection can be established if desired at each of the so-called intersections of the matrix), the first set of lines being connected one to each of the main connections of the binary trees.

In a convenient simple case, the first group of branch connections of a tree is one half of the branch connections and the second group is the other half. That is not, however, necessary and the groups may be unequal. Again it is not necessary that the two groups constitute all the branch connections of the tree concerned; it may be acceptable in some cases that in some or all of the trees there should be a number which are connected to only the one tree. Further the sizes of the two groups may conveniently be the same in every tree, particularly in the case where each constitutes half, but this again is not necessary, the only necessary condition being that there is at least one other tree having a group the same size as the first group of a given tree, in order that they may be connected in common, and similarly at least one further tree having a group the same size as the second group of the given tree.

It is also possible that in each of two trees, one of the groups may be zero, so that each has a first group which is connected in common with a group of connections in another tree, and a number of other branch connections which are connected only to the tree concerned. The first group can be less than the total number of branch connections and the second group zero, but the first group may be equal to the total number of branch connections.

It is also possible that several, i.e. more than two, trees can be connected in common to one or more branch connections. The entire above discussion could be repeated for each possibility, however, it is evident that an infinite number of possibilities can exist and for that reason the discussion of multiple connections will not be carried further.

Each binary switching tree may include switch contacts forming part of a set of electromagnetic relays together with means for selectively energizing any one or more of the relays to set the tree up so that a selected branch connection is connected to the main connection, it being arranged that for each branch connection there is different combination of relays which has to be energized, to set the tree up so that that branch is connected to the main connection.

The switching matrix may include an array of $(m\times l)$ switching contacts, each for establishing, when closed, a different one of the required connections between the matrix lines, the contacts each forming part of an equal number of electromagnetic relays, the matrix further including means for selectively energizing any one of the relays. It may be arranged that the switching system is controlled in response to signals representing instructions derived from a program store. For this purpose there may be provided in combination a program store, means for deriving from the store signals representing program words stored within it, at least one decoding device to which said signals are applied and which is arranged to produce control signals selectively in response to the program signals applied to it, and an electric switching system according to the present invention in which the switching trees are coupled to one or more decoding devices to be set up by or in response to the control signals.

Further, the switching system may be one according to the said feature of the present invention, the switching matrix also being coupled to one or more decoding devices so that the switching means within it can be controlled by or in response to the control signals from the decoding devices.

A switching system according to the present invention, or the said feature thereof, may be employed in combination with first and second sets of circuits, the first set being coupled to the branch connections of the switching trees and the second set being coupled either to the main connections of the trees or, if a switching matrix is provided, to the second set of lines of the switching matrix.

Where for example, the switching system forms part of an automatic testing equipment for a complex of equipment, such as an aircraft together with its instruments and systems, the first set of circuits may be circuits connecting the testing equipment to various signal sources, electrical circuits, devices or other items within the aircraft, while the second set of circuits may include measuring circuits and signal sources within the testing equipment. Under the control of instructions derived from a program store, for example a punched tape store, in the testing equipment, the switching system is set up at appropriate moments to couple various of the signal sources and measuring circuits in the testing equipment to selected circuits within the aircraft, so that the response of those circuits can be tested. Further, for some tests it may be necessary to provide connections between one or more pairs of the first set of circuits (e.g. pairs of circuits in the aircraft) and this also can be effected through the switching system. While the apparatus to be described in detail below was designed for a particular automatic testing equipment of this nature, it is to be understood that switching systems according to the invention are not limited in their applications to equipment of this nature.

An example of a switching system according to the present invention, including the said feature, will now be described with reference to the accompanying drawings in which.

The electric switching system to be described is one in which there is a first set of up to seven hundred and sixty-eight (48×16) connections and a second set of sixteen connections.

Figure 1:
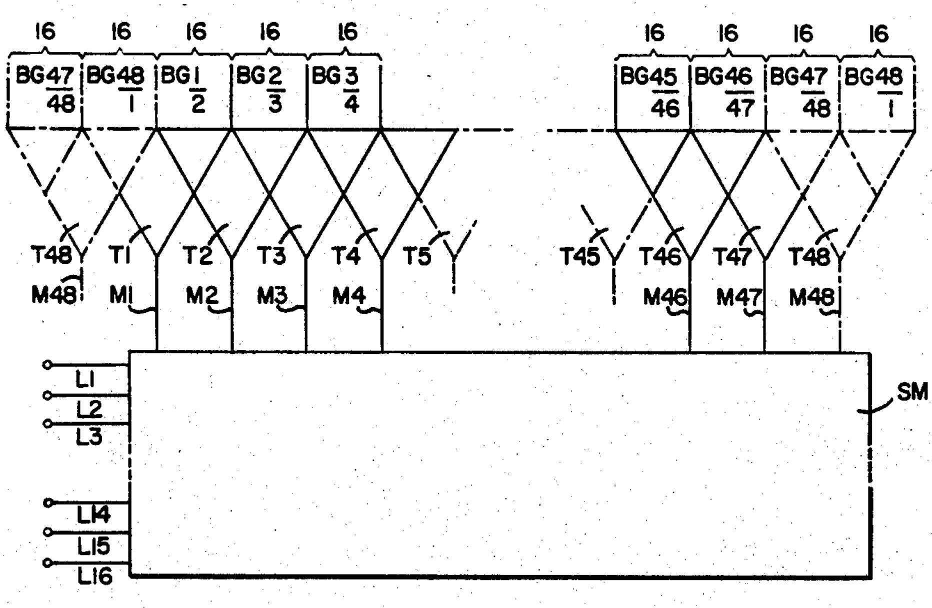
FIGURE 1 shows a block circuit diagram of the system.

As shown in FIGURE 1, this system includes forty-eight 5-level binary switching trees T1–T48, each represented schematically by a triangle of which the lower apex represents the terminal for connection to the main connection and the upper side represents a row of terminals for connection to the branch connections. The first set of connections is shown in forty-eight groups BG1/2–BG48/1, each of sixteen connections (the individual connections of the groups are not shown separately). Group BG1/2 is connected to form half of the thirty-two branch connections of tree T1 and also half of the thirty-two branch connections of tree T2. Each other group is similarly connected to form half the branch connections of each of two of the trees T1–T48 and it will be seen that the two numerals in the reference for each group are those of the two trees to which the group is connected in common. Some of the main connections M1–M48 of the trees T1–T48 are also shown.

Since the first and last trees T1 and T48 have common branch connections in the same manner as the remainder, tree T48 has been shown twice in FIGURE 1 as have groups BG47/48 and BG48/1 and main connection M48. The block outlines and connections which are duplicated have been shown chain-dotted. Trees T6–T44 and the corresponding connections and groups of connections are not shown in FIGURE 1. They are connected and arranged exactly as those which are shown, their presence being indicated by the incomplete ordinarily dotted lines between trees T5 and T45.

The connections M1–M48 form one set of forty-eight input lines to a conventional switching matrix SM having a second set of sixteen input lines L1–L16 of which only some are shown in FIGURE 1.

The trees T1–T48 are identical, each being arranged so that by suitably energizing relays of which the contacts in it form part, any one of the thirty-two branch connections, e.g. the connections of groups BG48/1 and BG1/2 in the case of tree T1, can be connected to the main connection e,g. connection M1, of the tree concerned. It will be seen however, that every branch connection is associated with two trees, e.g., trees T1 and T2 in the case of the connections in group BG1/2, so that, if during a switching sequence, one connection of say, group BG1/2 is required for use and is connected to connection M1 through tree T1, then any other branch connection can still be selected for use and connected to one of the other main connections M2–M48. In the case of another connection from group BG1/2, the main connection would have to be connection M2. If now a third connection is required, the only limitation on selection is that it cannot be one of group BG1/2. This offers a far greater freedom of selection than would be comparable arrangement with twenty-four five level trees having no common branch connections.

While FIGURE 1 shows a particular arrangement of the trees T1–T48, it is to be understood that other arrangements are also possible. The groups BG1/2–BG48/1 are shown as being equal in size and connected to two and only two trees. This is not necessary. The groups may be connected to one or more trees and do not have to be equal. Furthermore, it is not necessary that each of the trees have the same number of levels.

In the switching matrix SM, any of the connections M1–M48 can be connected at will and in known manner to any one or more of the other set of lines L1–L16 by setting up relays controlling normally open switch contacts of which there are sixteen associated with each of lines M1–M48 enabling a circuit to be established between each of these lines and any one of lines L1–L16.

Figure 2A:
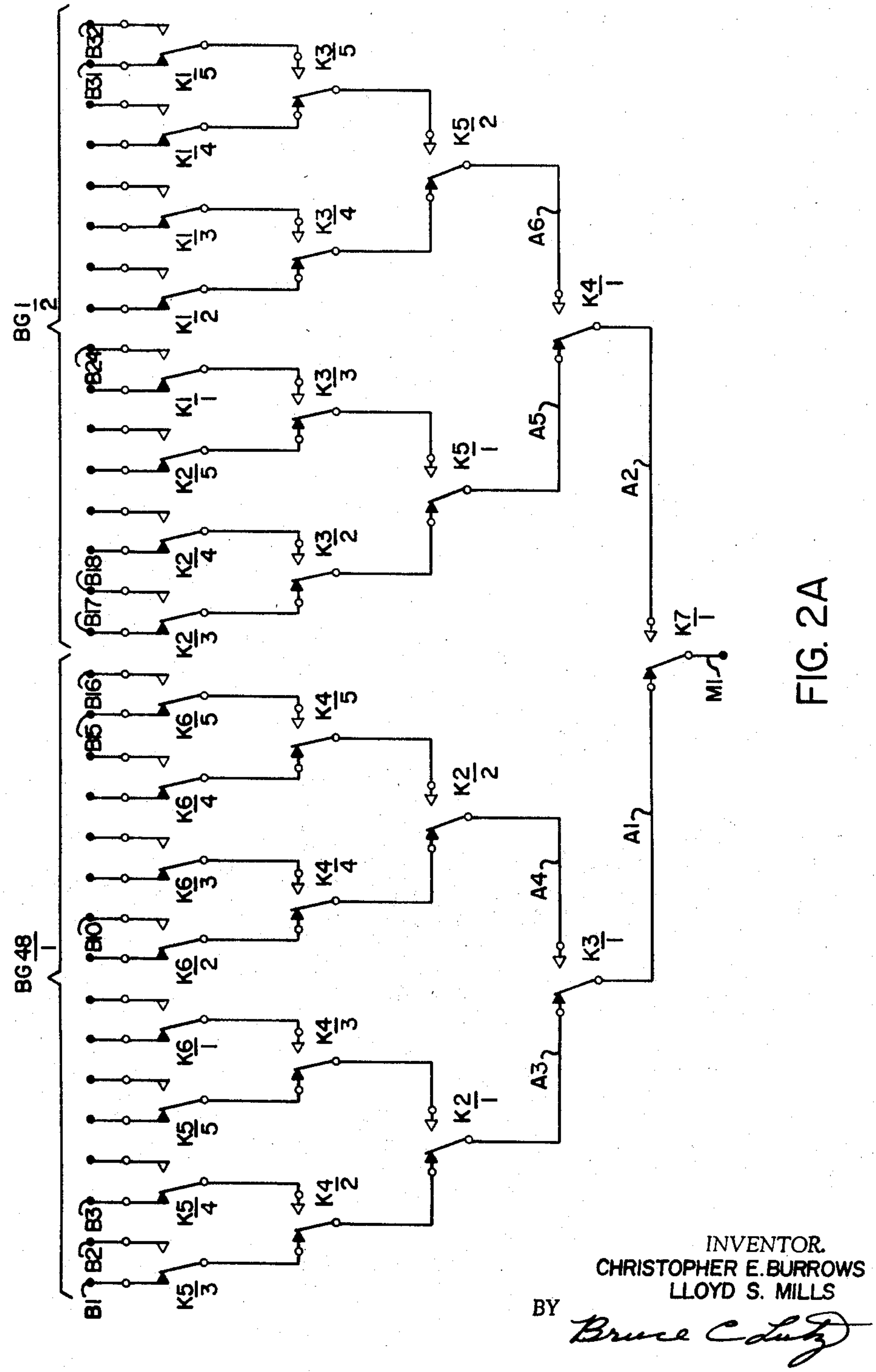
FIGURES 2A and 2B show the circuit diagram of one binary tree together with a block circuit diagram of apparatus for controlling it.
Figure 2B:
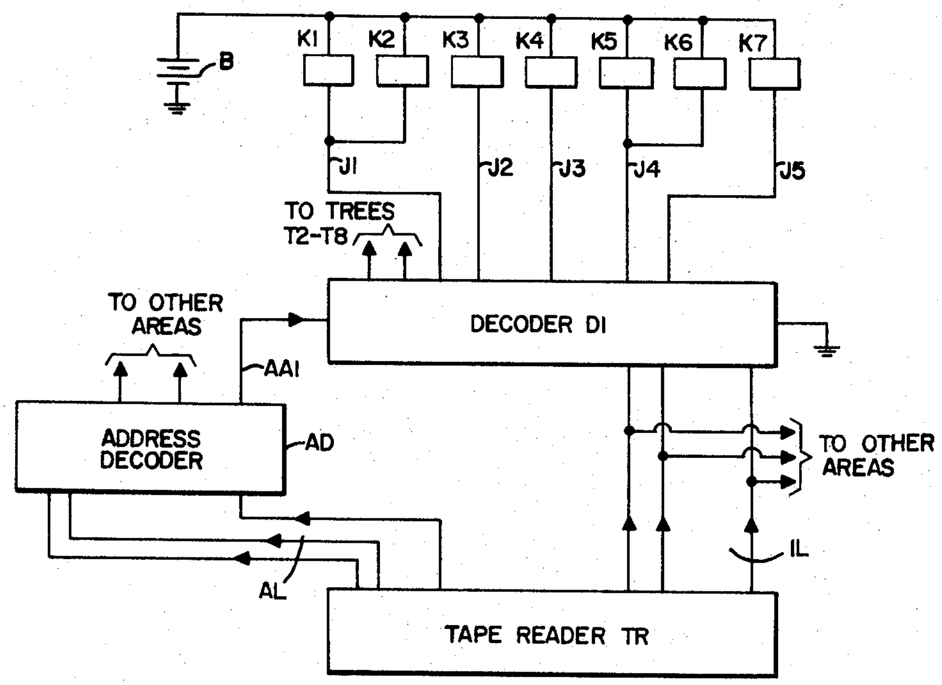

FIGURES 2A and 2B show the circuit of one of the binary trees T1–T48, assumed to be tree T1, this being a particular example of a five level binary tree arranged so that its condition can be controlled by energizing selected ones of seven relays K1–K7 in response to a five element binary signal which is shown by way of example as being generated in a decoder D1, this being coupled to a tape reader TR and an address decoder AD.

In choosing this example it is assumed that the switching system forms part of a larger system which is automatically controlled in operation by a series of program words recorded as groups of punched holes on a tape store. Each group is, in a conventional manner, arranged in a row across the width of the tape, the presence or absence of a hole in each of fourteen longitudinal columns on the tape being used to represent the word required. Of the fourteen columns six are devoted to information by way of "an address" and the other eight to the actual instruction. This tape format is given by way of example only. Variations will be obvious to those skilled in the art. The overall system includes a number of different sections or "areas" to any one of which a particular instruction may apply and an address decoder AD to which the address signals generated in the tape reader TR in response to the address part of each word are fed over a group of lines AL (not all of which are shown in FIGURE 2B). The address decoder operates in response to the signals received on lines AL to activate the "area" which the address part of each word designates. The group of instruction lines IL (not all of which are shown in FIGURE 2B) from the tape reader TR are connected to all the areas in common so that the signals derived by the reader TR from the instruction part of each program word are passed to all the areas.

The address decoder AD is linked separately to each area by lines AA of which only one complete one AA1, is shown in FIGURE 2B so that according to the address received the address decoder AD can effect some operation, such as applying a voltage or other signal to the line connecting it to the area designated by the address which activates the area concerned. In FIGURE 2, the only complete line AA1 shown is connected to the decoder D1 and serves to apply operating voltage to that decoder when the word includes an instruction for altering the condition of tree T1. In fact decoder D1 can be used to control other trees and is shown as controlling seven other trees T2–T8, the connections to which are not shown in FIGURE 2, the decoder D1 and trees T1–T8 together constituting a single area to which a single address applies.

Five other similar decoders D2–D6 (not shown) are provided to form five other similar areas, each being associated with a further different group of six of the trees T9–T48. Other areas (not all described) may also be present and coupled to both the tape reader TR and the address decoder AD. Three such areas, as described below are used to control the condition of the switching matrix SM.

Thus to set up a given connection in one of the trees, a program word will include the appropriate one of the six addresses used to designate the areas including the decoder D1–D6 and the trees T1–T48 and an instruction which will on decoding effect the selection of a particular path through one of the eight trees in the area concerned. It will be appreciated that the connection between the address decoder AD and an area may include more than one lead in some or all cases, for example a pair of leads forming a "go" and a "return" path for an activating signal.

Any word which requires the setting up of a particular path in tree T1 will include the address for the area in which it is included and an instruction which will cause decoder D1, on activation by the address decoder AD to select and connect to earth through the decoder D1 a particular combination of the lines J1–J5. Line J1 is connected to one side of each of two relay coils K1 and K2, the other sides of which are connected, together with similar connections from relay coils K3–K7 to one side of a 28 volt DC power source B. Similarly, line J2 is connected to coil K3, line J3 to coil K5, line J4 to coils K5 and K6 and line J5 to coil K7. It will be seen that, depending on the earth connections effected within the decoder D1, a particular combination of the coils K1–K7 will be energized.

The changeover switching contacts K1/1–K1/5, K2/1–K2/5, K3/1–K3/5, K4/1–K4/5, K5/1–K5/5, K6/1–K6/5 and K7/1 associated with coils K1–K7 are connected as shown in FIGURE 2A to form the five-level binary switching tree T1 which is capable of connecting its main connection M1 to any one of thirty-two branch connections B1–B32 of which connections B1–B16 form group BG48/1 (FIGURE 1) and connections B17–B32 form group BG1/2 (FIGURE 1). (Some references are omitted in FIGURE 2A for clarity.

The moving contact of contact K7/1 is connected to the main connection M1 and its fixed contacts to two lines A1 and A2. Lines A1 and A2 are connected to the moving contacts of contacts K3/1 and K4/1 respectively, the fixed contacts of which are respectively connected to the pair of lines A3 and A4 and the pair of lines A5 and A6. This arrangement continues through the tree, each contact enabling the line connected to its moving contact to be connected to one of two lines connected to its fixed contacts until finally in the fifth level, the lines connected to the fixed contacts are the branch connections B1–B32. It can be seen by tracing the paths from main connection M1 to each of the branch connections (e.g. from M1 to B24 through contacts K7/1, K4/1, K5/1, K3/3 and K1/1) that each path involves five contacts and that in every case these are the contacts of five different relays.

Apart from relay K7 which controls the first level contact, all the relays K1–K6 have five contacts. In the case of contacts K6/1–K6/5 and K1/1–K1/5, they are all connected to similar positions in the fifth level of the tree, so that energization of either relay K1 or K6 is required, if at all, when selecting between a pair of the branch connections B1–B32. The other relays K2–K5 have contacts connected in different levels of the tree, e.g. relay K2 has contacts K2/1 and K2/2 in the left hand half of the third level and contacts K2/3 and K2/5 in the right hand half of the fifth level, but it will be seen that in each case, the contacts in different levels are in opposite halves of the tree. Thus, continuing for example to consider only relay K2, contacts K2/1 and K2/2 can be effective only when relay K7 is unenergized and the condition of contacts K2/3–K2/5 is then immaterial. Similarly, if relay K7 is energized the condition of contacts K2/3–K2/5 may be material, but that of contacts K2/1 and K2/2 is not. Similar considerations apply to relays K3–K5. The coils of relays K1 and K2 are connected in parallel between line J1 from decoder D1 and the Battery B, since contacts K1/1–K1/5 and K2/3–K2/5 together control the final selection at the fifth level of the right hand half of the tree and need therefore to be energized simultaneously. Similarly the coils of relays K5 and K6 are in parallel since contacts K5/3–K5/5 and K6/1–K6/5 control the fifth level of the left hand half of the tree. It will be appreciated that it is not necessary to use relays with five contacts because relays K1 and K2 could be replaced by a ten contact relay. The same is true of relays K5 and K6. Other combinations of relays and contacts are also possible.

Figures 3, 4A:
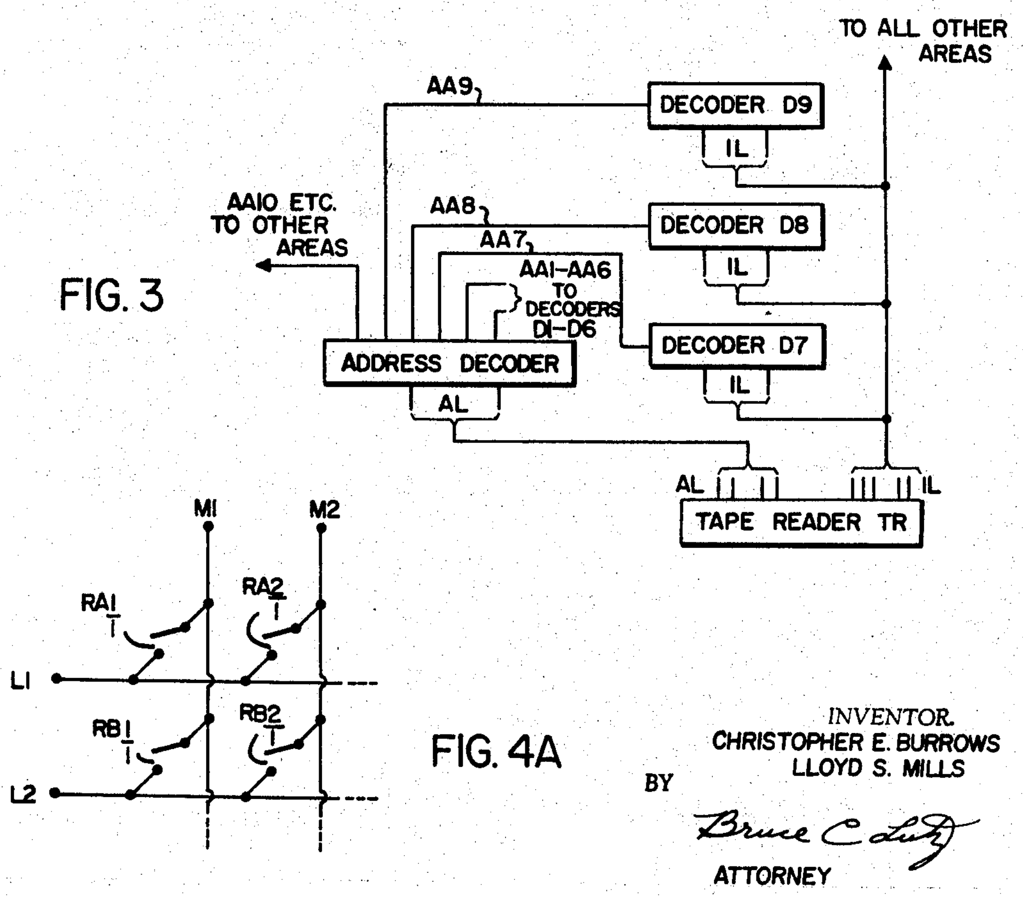
FIGURE 3 shows a block circuit diagram of further control apparatus.
FIGURES 4 and 4A show circuit diagrams of the switching matrix and parts of a decoder used in conjunction with it.

The same tape reader TR that is shown in FIGURES 2A and 2B and a further group of decoders D7–D9 are employed, see FIGURE 3, to control the energization of an array of relays provided to determine the condition of the contacts in the switching matrix SM (FIGURE 1). There are (48×16) possible connections which may be needed to be madt within the matrix SM in order that any one of the lines M1–M48 can be connected to any one of the lines L1–L16. Each such connection is provided when required by closing a separate normally open switch contact which forms part of one of the array of relays. The relays are divided into three groups of (16×16), each group being controlled by one of the three decoders D7–D9, each decoder and its associated relay group forming a separate area within the whole equipment which is designated by a specific address.

Each of the decoders D7–D9 is therefore coupled to the address decoder AD by the respective one of three lines AA7–AA9, over which an operating voltage is supplied to the decoder selected when the appropriate address is passed from the tape reader TR to the address decoder AD. Decoder D7 controls relays for effecting connections between lines M1–M16 and L1–L16, decoder D8 between lines M17–M32 and L1–L16 and decoder D9 between lines M33–M48 and L1–L16.

The tape reader TR is arranged in known manner so that when a word is being sensed, there are two output lines for each possible tape hole position, one on which a predetermined positive voltage (for example 28 volts D.C.) appears only when a hole is sensed and one on which the same voltage appears only when no hole is sensed. In each case when the predetermined voltage is not present the output lines are held at 4 volts D.C. In some areas, and in particular those which include decoders D7–D9, connections to both kinds of tape reader output lines are required for operation of the decoder. In others, connections to only one set of lines, for example those giving a voltage when a hole is sensed, may be all that is necessary.

Figure 4:
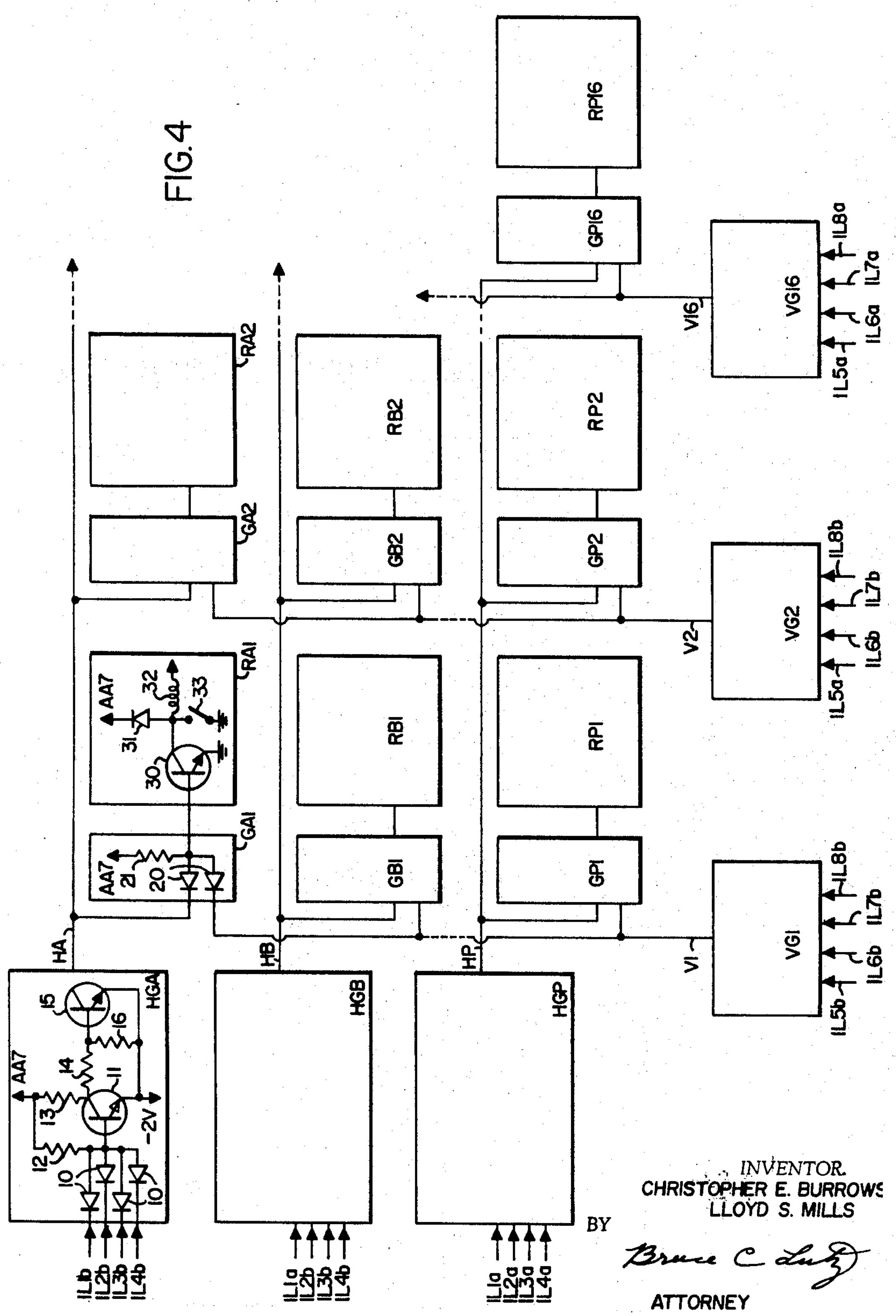

FIGURE 4 shows the circuit diagram of decoder D7, decoders D8 and D9 being identical except that they are connected to lines AA8 and AA9 respectively instead of lines AA7 from the address decoder AD.

In FIGURE 4, the circuits shown are those which control the selective energization of (16×16) relays one for each possible connection in the one third of the matrix SM controlled by decoder D7, in accordance with signals received from the tape reader TR on lines IL.

The coil of each relay is included in a relay circuit which is the same in every case. In FIGURE 4 only relay circuit RA1 is shown in detail, the remainder, if shown at all, being shown as blocks. The relay circuits are arranged in sixteen rows of sixteen, the circuits in the first row being given references RA1–RA16, the second row RB1–RB16 and so on to the sixteenth row where the references are RP1–RP16. The relays in circuits RA1–RA16 control the contacts for effecting connection between lines M1–M16, respectively and line L1. Similarly the succeding rows of relay circuits each have relays controlling the connections between lines M1–M16 and the corresponding ones of lines L2–L16 in order. The relays are normally not energized in which condition the contacts they control are open. FIGURE 4A shows a part only of the matrix SM, including parts of lines M1, M2, L1 and L2 and the contacts RA1/1, RA2/1, RB1/1 and RB/2 of the relays in circuits RA1, RA2, RB1 and RB2 which control the connections between those lines. The remainder of the matrix is similar.

The decoder D7 further includes a matrix of sixteen horizontal lines HA–HP and sixteen vertical lines V1–V16. Relay circuit RA1 is controlled by a gate circuit GA1 forming part of a series of (16×16) identical gate circuits, GA1–GA16 . . . GP1–GP16, associated one with each of the relay circuits. Gate circuit GA1 has input connections to horizontal line HA and vertical line V1 and the other gate circuits similarly each have a pair of input connections one to a horizontal and one to a vertical line, but a different pair in each case. Of the gate circuits shown in FIGURE 4, gate circuit GA2 for example is connected to lines HA and V2 and gate circuit GP16 to lines HP and V16. The remainder are connected in the order indicated by their references.

Each of lines HA–HP is connected to the output of the corresponding one of a series of gate circuits HGA–HGP. Each of lines V1–V16 is similarly connected to the output of the corresponding one of a series of gate circuits VG1–VG16. All the gate circuits HGA–HGP and VG1–VG16 are identical apart from their extrnal connections and only the gate circuit HGA is shown in detail. All the gate circuits of the three series HGA–HGP, VG1–VG16, GA1–GA16 . . . GP1–GP16 and the relay circuits RA1–RA16 . . . . RP1–RP16 require a positive 28 volt D.C. voltage to be able to operate and this voltage is derived by connection to line AA7 to which this voltage is supplied by the address decoder AD only when it is required to activate the decoder D7. Otherwise the decoder D7 is rendered ineffective by the lack of this operating voltage. The detailed circuits of gates GA1 and HGA and relay RA1 have arrows labelled AA7 indicating the points at which these circuits require to be connected to line AA7.

Each of gate circuits HGA–HGP and VG1–VG16 has four input connections. Assuming, for example, that the eight columns on the tape allocated to the instruction part of each program word are numbers 1 to 8, the lines IL on which voltages corresponding to the sensing or otherwise of holes in these columns appear, are in two series, lines IL1*a* to IL8*a* and IL1*b* to IL8*b*. The numeral indicates the column with which each liner is associated and the suffix *a* or *b* indicates respectively that the line is one on which no voltage appears when a hole is sensed.

Gate circuits HGA–HGP are each connected to a different combination of four of the lines IL1*a*–IL4*a* and IL1*b*–IL4*b* in such a way that for every possible combination of holes appearing in column 1–4 of the tape a different one, and only one for each combination, of the circuits HGA–HGP will receive a positive voltage on all four of its input connections. Circuits VG1–VG16 are similarly connected to lines IL5*a*–IL8*a* and IL5*b*–IL8*b*. Any gate circuit HGA–HGP or VG1–VG16 normally maintains its output connection at or near earth potential but, as will be explained, allows the line to float at a positive voltage when it receives a positive voltage on all four of its input connections. Thus any particular combination of holes in the first eight columns of the tape, assuming the address represented by the holes in the other columns is that which results in the application of a positive voltage to line AA7 by the address decoder AD, will result in one only of lines HA–HP becoming positive together with one only of lines V1–V16. The gate circuits GA1 etc., operate, as will be described, to maintain their output connections at or near earth if either or both input connections is or are at or near earth. Only when both input connections float does its output connection rise to a positive voltage which causes the associated relay circuit to energize the relay incorporated in it. Thus the selection of one horizontal and one vertical line will result in a particular one of the gate circuits GA1 etc., actuating the relay circuit associated with it. There are $2^8$, i.e. 256, different combinations of holes possible in eight columns and the decoder D7 contains (16×16) i.e. 256, relay circuits of which, as described above, a different one will be actuated in response to each different tape combination.

Gate circuit HGA has its four input connections connected to lines IL1*b*, IL2*b*, IL3*b* and IL4*b* as indicated in FIGURE 4. A positive voltage will appear on these four lines together only when there is no hole sensed in each of columns 1–4. The input connections are made one to the negative pole of each of four semi-conductor diodes 10, the positive poles of which are connected together to the base of an n-p-n transistor 11 and to one terminal of a resistor 12. The other terminal of resistor 12 is connected in common with one terminal of a further resistor 13 to line AA7 as indicated by the arrow so that a positive 28 volts DC voltage appears at that point as long as decoder D7 is activated. The other terminal of resistor 13 is connected to the collector of the transistor 11, the emitter of which is connected to a minus 2 volt DC supply line. A resistor 14 is connected between the base of a further transistor 15 and the collector of transistor 11. The collector of the transistor 15 is connected to the line HA and its emitter is connected to the minus 2 volt line. A resistor 16 is connected between its base and the minus 2 volt line.

Assuming the positive voltage is applied from line AA7, the circuit HGA operates as follows. Unless all four output connections are positive, the gate circuit formed by the diodes 10 will operate so that base of the transistor 11 is at a voltage such that it is held non-conducting. The base of transistor 15 will therefore have the operating voltage from line AA7 applied to it through the resistors 13 and 14 and will therefore be conducting, maintaining line HA at or near earth potential. As soon as all four input connections are positive, the voltage at the base of the transistor 11 will rise, the transistor 11 will become conducting, the voltage at the base of transistor 15 will drop to a voltage such that it will become non-conducting and line HA will no longer be at earth potential but will be "floating."

Gate circuit GA1 is simply a pair of diodes 20 having their negative poles connected to lines HA and V1 and their positive poles connected together to the output connection and to one side of a resistor 21, the other side of which is connected to line AA7. Assuming the positive voltage is applied to line AA7, the output connection will normally be at or near earth as one or both of the input connections HA and V1 will be at or near earth. If both become "floating," as a result of both gates HGA and VG1 receiving a positive voltage on all four input connections, the output connection of gate GA1 will rise to a positive voltage.

Relay circuit RA1 includes an n-p-n transistor 30 having its base connected to the input connection from the gate circuit GA1. Its emitter is connected to earth and its collector to one side of a diode 31 the other side of which is connected to the line AA7. Its collector is also connected to one of the terminals of the coil 32 of the relay incorporated in the circuit and to one side of a normally open contact 33 of the relay. The other side of the contact 33 is earthed and the other side of coil 32 is connected to a common line for all the relay circuits, which is maintained at 28 volts DC. Relay circuit RA1 operates as follows. When the base of the transistor 30 is held at or near earth by the gate circuit GA1 the transistor 30 is non-conducting and the coil 32 un-energized. When the input connection rises to a positive voltage, the transistor 30 becomes conducting and current can flow through the coil 32 to the collector of transistor 20 thus energizing the relay. Contact 33 then closes to hold the coil 32 energized.

As mentioned previously, the switching system described above is designed for use in an automatic testing equipment for aircraft, although it or other switching systems according to the invention may readily find application in other equipment. In the automatic testing equipment concerned, the seven hundred and sixty-eight branch connections are taken away simply to a multi-way connector which, when coupled to a similar mating connector on the aircraft, results in the branch connections being coupled to different circuits within the aircraft. The term "circuits" is here used to mean not only actual electric circuits within the aircraft and its equipment but also, for example, items such as power sources, signal sources, including such items as radio receivers, gyroscopes and automatic control equipment all of which may in certain circumstances give rise to output signals and also transducers which give rise to signals on operation of items of equipment not necessarily electrical within the aircraft, signal inputs to various items of equipment, and the inputs of other electrically operated or actuated devices.

In the equipment itself, some of the lines L—L16 of the switching matrix can be coupled through proportioning and auxiliary switching networks to various signal sources. For example sources of a fixed DC or AC voltage or a ramp voltage, so that a variety of signals of differing magnitudes, as determined by the proportioning networks, are available for application through the main switching network to selected circuits in the aircraft. A further decoder is provided to control the setting up of the proportioning and auxiliary swiching networks.

Others of the lines L1–L16 can be coupled to the measurement circuits. These include a digital voltmeter and a signal conditioning network. The latter includes various signal translating networks such as attenuators, filters and demodulators for converting a signal received from any aircraft circuit through the main switching network to a form suitable for measurement by the digital voltmeter. Again, a further decoder is provided to control the actual form of the conditioning network at any instant. Where a particular test requires a comparison with a standard result, the output of the digital voltmeter for a particular test is fed to a comparator to which also is fed a standard value derived from information punched on the tape.

The timing of the different switching and other functions required for each test and the order of the tests themselves is controlled by the order of the program words on the tape and the operation of the tape reader.

The above is an outline description only of the automatic test equipment intended to illustrate one manner in which a switching system according to the invention may be employed. The arrangement, according to the invention whereby the branch connections to the trees, and therefore the aircraft circuits, can each be connected to alternative main connections renders the programming of the equipment much more flexible than in similar equipment using conventionally connected trees in which each branch connection can be connected to only one main connection.

While a specific example is show by way of illustration only, the applicants do not wish to be limited in any way by the specific example but only by the appended claims.

We claim as our invention:

1. An electric relay switching system comprising, in combination:

a number $m$ of binary switching trees, each of said trees having $n$ levels, each of said trees capable of being set up selectively to connect a main connection to any one of $2^n$ branch connections, each of said trees having a first group of branch connections comprising one-half of said $2^n$ branch connections connected in common one with each of an equal number of the branch connections of a second of said $m$ switching trees and a second group of its branch connections comprising the other half of said $2^n$ branch connections connected in common one with each of an equal number of the branch connections of a third of said m switching trees, and the arrangement being such that each of said first and second groups of branch connections of each tree can be connected to the main connection of either of the two trees to which it is common;

relay means, the contacts of said relay means forming the switches of said $m$ switching trees;

a relay switching matrix having a first set of $m$ lines, a second set of $l$ lines, and relay means operable to selectively connect each of the $l$ matrix lines to any of the $m$ matrix lines;

$l$ input means;

means connecting said $l$ matrix lines each to one of said $l$ input means;

means connecting said $m$ matrix lines each to one of said main connections of said $m$ switching trees; and control means for accepting coded control signals and, in accordance with the coded control signals, selectively energizing certain of the relays of said switching trees and of said matrix thereby establishing connections between said branch connections of said $m$ switching trees and said $l$ input means.

2. An electric switching system comprising, in combination:

a number $m$ of binary relay switching trees, the relays of each of said trees being capable of being set up selectively to connect a main connection to any one of a number of branch connections, each of said trees having at least first and second groups of branch connections, the branch connections of said first group being connected in common one with each of an equal number of branch connections of a second of said $m$ switching trees, the branch connections of said second group being connected in common one with each of an equal number of branch connections of a third of said $m$ switching trees, and the arrangement being such that each of said first and second groups of branch connections of each tree can be connected to the main connection of either of the two trees to which it is common;

$l$ input means where $l$ is a predetermined quantity;

an $m \times l$ relay switching matrix having a first set of $m$ matrix lines, a second set of $l$ matrix lines each of the $m$ matrix lines connected one to each of said main connection of said $m$ switching trees and each of the $l$ matrix lines connected one to each of said $l$ input means whereby connections can be selectively established between said $l$ input means and said branch connections of said $m$ switching trees; and control means including program store means and decoding means, said program store means operable to produce coded signals, and said decoding means operable to decode said coded signals and to control the energization of the relays of said switching tree and said switching matrix in accordance with said coded signals whereby the connections between said $l$ input means and said branch connections of said $m$ switching trees are effected in accordance with a predetermined operating sequence.

3. An electric switching system comprising, in combination:

a plurality of relay switching trees, each of said trees being capable of providing a connection between a main connection and a multiplicity of branch connections by selectively energizing certain relay combinations, the branch connections of each of said switching trees being divided into groups, at least one of said groups of branch connections of each of said switching trees being in common one with each of a group of an equal number of branch connections of at least one other of said switching trees, and the arrangement being such that each of said branch connections connected in common with more than one of said switching trees can be connected to the main connection of any of the trees to which it is common;

a relay switching matrix of which a first set of matrix lines is equal in number to said switching trees and are connected in a one to one correspondence with said main connections of said switching trees, and a second set of matrix lines, the relays of the matrix operable to selectively connect said matrix lines of said first and second sets for the passage of electrical signals therebetween; and control means operable to energize the relays of said switching trees and of said switching matrix to selectively establish electrical connections between predetermined matrix lines of said second set and predetermined branch connections of said switching trees.

4. An electrical switching system comprising, in combination:

input means;

output means;

a number $m$ of binary relay switching trees, each of said trees having $n$ levels, each of said trees capable of being set up selectively to connect a main connection to any one of $2^n$ branch connections, each of said trees having a first group of branch connections comprising one-half of said $2^n$ branch connections connected in common one with each of an equal number of the branch connections of a second of said $m$ switching trees, each of said trees having a second group of branch connections comprising the other half of said $2^n$ branch connections connected in common one with each of an equal number of the branch connections of a third of said $m$ switching trees, and the arrangement being such that each of said branch connections can be connected to the main connection of either of the two trees to which it it common;

means connecting said input means to said main connections of said $m$ switching trees;

means connecting said output means to said branch connections of said $m$ switching trees; and control means operable to selectively set up the relays of the $m$ switching trees to connect said branch connections to said main connections in accordance with a predetermined sequence of instructions.

5. An electric switching system comprising, in combination:

a number $m$ of relay switching trees, each having $n$ levels, each capable of being selectively set up so that each of its $2^n$ branch connections can be connected to its main connection, and the branch connections of each of said switching trees being divided into first and second groups with the condition that for each group of a given size there must be another group on a different switching tree that is equal in size;

means connecting said first group of branch connections of each of said switching trees in parallel with a group of an equal number of branch connections of another of said $m$ switching trees and further connecting said second group of branch connections of each of said switching trees in parallel with a group of an equal number of branch connections of yet another of said $m$ switching trees whereby each of said branch connections may be connected to either of the main connections of the two trees that it is in common with; and control means operable to selectively connect the branch connections to the main connections of said switching trees.

6. An electric switching system operable to connect selected ones of a first group of connections to a second group of connections comprising, in combination:

a plurality of relay switching trees; each of said trees being connected to a plurality of connections of the first group and one of the connections of the second group, said plurality of connections of the first group further being divided into sub-groups, some of which may be zero sub-groups, and at least one of said sub-groups of each of said trees being connected in parallel with another of said sub-groups of another of said trees; and energization means operable to selectively connect said connections of said second group to said connections of said first group.

7. Apparatus of the class described comprising, in combination:

a plurality of relay switching trees each having a main connection;

a number of branch connections, each of said branch connections being connected in common with at least two of said switching trees, the combination being such that each of the branch connections can be selectively connected to the main connection of either or both of said switching trees to which it is common; and control means operable to control the relays of said switching trees in accordance with a predetermined switching pattern.

8. Switching apparatus comprising, in combination:

a plurality of switching trees, each of said trees having a main connection and a plurality of branch connections, each of said trees capable of being selectively organized to connect one of said branch connections to said main connection, and said plurality of branch connections of each of said trees being divided into at least two groups; and means connecting at least one of said groups of branch connections of each of said trees in common with another group of branch connections of at least one other of said trees whereby each of said branch connections connected in common with more than one tree can be selectively connected to the main connection of any of the trees with which it is common.

9. Switching apparatus comprising, in combination:

a plurality of switching trees each having a main connection and a plurality of branch connections divided into groups; and means connecting two of said groups of branch connections of each tree in common with the branch connections of at least two different trees, one of said common groups being in common with one of said different trees and the other of said common groups being in common with the other of said different trees, the arrangement being such that each of said branch connection connected in common with more than one of said trees can be selectively connected to any of the main connections of said trees with which it is common.

References Cited

UNITED STATES PATENTS

| | | | |
|---|---|---|---|
| 3,047,840 | 7/1962 | Harms et al. | 340—147 XR |
| 3,110,885 | 11/1963 | Gibson et al. | 340—147 |

JOHN W. CALDWELL, *Primary Examiner.*

DONALD J. YUSKO, *Assistant Examiner.*